US012641685B2

(12) United States Patent
Abi Aoun et al.

(10) Patent No.: US 12,641,685 B2
(45) Date of Patent: *May 26, 2026

(54) APPARATUS FOR A RESONANCE CIRCUIT

(71) Applicant: Nicoventures Trading Limited, London (GB)

(72) Inventors: Walid Abi Aoun, London (GB); Gary Fallon, London (GB); Julian Darryn White, Cambridge (GB); Martin Daniel Horrod, Cambridge (GB)

(73) Assignee: NICOVENTURES TRADING LIMITED, London (GB)

( * ) Notice: Subject to any disclaimer, the term of this patent is extended or adjusted under 35 U.S.C. 154(b) by 149 days.

This patent is subject to a terminal disclaimer.

(21) Appl. No.: 18/453,665

(22) Filed: Aug. 22, 2023

(65) Prior Publication Data

US 2023/0397304 A1 Dec. 7, 2023

Related U.S. Application Data

(63) Continuation of application No. 16/497,597, filed as application No. PCT/EP2018/057835 on Mar. 27, 2018, now Pat. No. 11,765,795.

(30) Foreign Application Priority Data

Mar. 21, 2017 (GB) ...................................... 1705206

(51) Int. Cl.

*H05B 6/06* (2006.01)
*A24F 40/465* (2020.01)

(Continued)

(52) U.S. Cl.

CPC ............. *H05B 6/06* (2013.01); *A24F 40/465* (2020.01); *A24F 40/50* (2020.01); *C25D 3/12* (2013.01);

(Continued)

(58) Field of Classification Search

CPC ...... H05B 6/06; H05B 6/105; H05B 2206/02; A24F 40/465; A24F 40/50; A24F 40/20; A24F 40/57; C25D 3/12

(Continued)

(56) References Cited

U.S. PATENT DOCUMENTS 9,060,388 B2 6/2015 Liu
10,028,533 B2 7/2018 Fursa et al.

(Continued)

FOREIGN PATENT DOCUMENTS

AU 2018241908 B2 9/2020
AU 2020281092 A1 1/2021

(Continued)

OTHER PUBLICATIONS

Examination Report No. 1 for Australian Patent Application No. 2020281092, mailed on Oct. 13, 2021, 4 pages.

(Continued)

*Primary Examiner* — Phuong T Nguyen
(74) *Attorney, Agent, or Firm* — BURR & FORMAN

(57) ABSTRACT

Disclosed is a method and apparatus for use with an RLC resonance circuit for inductive heating of a susceptor of an aerosol generating device. The apparatus is arranged to determine a resonant frequency of the RLC resonance circuit; and determine, based on the determined resonant frequency, a first frequency for the RLC resonance circuit for causing the susceptor to be inductively heated, the first frequency being above or below the determined resonant frequency. The apparatus may be arranged to control a drive frequency of the RLC resonance circuit to be at the determined first frequency in order to heat the susceptor. Also disclosed is an aerosol generating device including the apparatus.

27 Claims, 5 Drawing Sheets

(51) Int. Cl.
*A24F 40/50* (2020.01)
*C25D 3/12* (2006.01)
*H05B 6/10* (2006.01)
*A24F 40/20* (2020.01)

(52) U.S. Cl.
CPC .............. *H05B 6/105* (2013.01); *A24F 40/20* (2020.01); *H05B 2206/02* (2013.01)

(58) Field of Classification Search
USPC ....... 392/320, 321, 324, 341, 342, 386, 387, 392/395; 219/600
See application file for complete search history.

(56) References Cited

U.S. PATENT DOCUMENTS

| | | | |
|---|---|---|---|
| 10,085,303 B2 | 9/2018 | Schilling et al. | |
| 10,412,789 B2 | 9/2019 | Henke et al. | |
| 10,674,763 B2 | 6/2020 | Zinovik et al. | |
| 2004/0149737 A1 | 8/2004 | Sharpe et al. | |
| 2005/0066735 A1 | 3/2005 | Beavis et al. | |
| 2010/0313901 A1 | 12/2010 | Stahle et al. | |
| 2011/0120989 A1* | 5/2011 | Schilling ................ | H05B 6/062 219/661 |
| 2012/0132647 A1 | 5/2012 | Beverly et al. | |
| 2013/0199027 A1 | 8/2013 | Singh et al. | |
| 2014/0015329 A1 | 1/2014 | Widmer et al. | |
| 2015/0157756 A1 | 6/2015 | Duffield et al. | |
| 2015/0245669 A1 | 9/2015 | Cadieux et al. | |
| 2015/0320116 A1 | 11/2015 | Bleloch et al. | |
| 2016/0088685 A1 | 3/2016 | Henke et al. | |
| 2016/0150825 A1 | 6/2016 | Mironov et al. | |
| 2016/0248280 A1* | 8/2016 | Ben-Shalom ........... | H02J 50/10 |
| 2016/0295921 A1 | 10/2016 | Mironov et al. | |
| 2017/0055575 A1 | 3/2017 | Wilke et al. | |
| 2017/0055582 A1 | 3/2017 | Blandino et al. | |
| 2017/0055583 A1 | 3/2017 | Blandino et al. | |
| 2017/0055585 A1 | 3/2017 | Fursa et al. | |
| 2017/0055587 A1 | 3/2017 | Zinovik et al. | |
| 2018/0214645 A1 | 8/2018 | Reevell | |
| 2019/0098930 A1 | 4/2019 | Fallon et al. | |
| 2020/0297031 A1 | 9/2020 | Zinovik et al. | |
| 2021/0093008 A1 | 4/2021 | White et al. | |
| 2021/0093012 A1 | 4/2021 | White et al. | |
| 2021/0186109 A1 | 6/2021 | Milligan et al. | |

FOREIGN PATENT DOCUMENTS

| | | | |
|---|---|---|---|
| CA | 2989375 | A1 | 1/2017 |
| CN | 1495417 | A | 5/2004 |
| CN | 1545823 | A | 11/2004 |
| CN | 1679419 | A | 10/2005 |
| CN | 102186271 | A | 9/2011 |
| CN | 102539005 | A | 7/2012 |
| CN | 102575954 | A | 7/2012 |
| CN | 104095291 | A | 10/2014 |
| CN | 204440191 | U | 7/2015 |
| CN | 204599333 | U | 9/2015 |
| CN | 105307524 | A | 2/2016 |
| CN | 105307525 | A | 2/2016 |
| CN | 106455712 | A | 2/2017 |
| DE | 102009047185 | A1 | 6/2011 |
| EP | 703735 | A1 | 4/1996 |
| EP | 703735 | B1 | 7/2001 |
| EP | 2330866 | A2 | 6/2011 |
| EP | 2512205 | A1 | 10/2012 |
| EP | 2645814 | A1 | 10/2013 |
| EP | 2967156 | A1 | 1/2016 |
| EP | 2975958 | A1 | 1/2016 |
| EP | 2996504 | A1 | 3/2016 |
| EP | 2967156 | B1 | 11/2016 |
| EP | 2996504 | B1 | 11/2016 |
| EP | 3603333 | B1 | 6/2022 |
| IT | RM20120193 | A1 | 8/2012 |
| JP | H06295782 | A | 10/1994 |
| JP | H09257256 | A | 9/1997 |
| JP | 2011113977 | A | 6/2011 |
| JP | 2013054873 | A | 3/2013 |
| JP | 2013073939 | A | 4/2013 |
| JP | 5478735 | B2 | 4/2014 |
| JP | 5586433 | B2 | 9/2014 |
| JP | 2014229498 | A | 12/2014 |
| JP | 5662344 | B2 | 1/2015 |
| JP | 2016524777 | A | 8/2016 |
| JP | 2016525341 | A | 8/2016 |
| JP | 2017506915 | A | 3/2017 |
| JP | 7091592 | B2 | 6/2022 |
| KR | 100385395 | B1 | 8/2003 |
| KR | 20070093218 | A | 9/2007 |
| KR | 20150143877 | A | 12/2015 |
| KR | 20150143891 | A | 12/2015 |
| RU | 2135054 | C1 | 8/1999 |
| WO | 9406314 | A1 | 3/1994 |
| WO | 9527411 | A1 | 10/1995 |
| WO | 2011070785 | A1 | 6/2011 |
| WO | 2015177043 | A1 | 11/2015 |
| WO | 2015177256 | A1 | 11/2015 |
| WO | 2015177257 | A1 | 11/2015 |
| WO | 2015177294 | A1 | 11/2015 |
| WO | 2016184929 | A1 | 11/2016 |
| WO | 2017001819 | A1 | 1/2017 |
| WO | 2017085242 | A1 | 5/2017 |
| WO | 2017149093 | A1 | 9/2017 |
| WO | 2017205692 | A1 | 11/2017 |
| WO | 2018073376 | A1 | 4/2018 |
| WO | 2020047417 | A1 | 3/2020 |

OTHER PUBLICATIONS

Extended European search report for Application No. 22168588.6, mailed on Oct. 6, 2022, 13 pages.
Extended European Search Report for Application No. 22175887.3, mailed on Oct. 21, 2022, 16 pages.
Notice to File a Response mailed Dec. 5, 2022, for Korean Application No. 10-2022-7014032, 25 pages.
Office action for Brazilian Application No. 112019020551-9, mailed on Sep. 13, 2022, 4 pages.
Office action for Brazilian Application No. 112019020557-8, mailed on Sep. 29, 2022, 7 pages.
Office action for Japanese Application No. 2021134922, mailed on Oct. 18, 2022, 5 pages.
Office action for Korean Application No. 10-2021-7042466, mailed on Sep. 21, 2022, 4 pages.
Office Action for Malaysian Application No. PI2019005294, mailed on Aug. 9, 2022, 4 pages.
Examination Report for Indian Application No. 201947043640, mailed on Aug. 11, 2020, 7 pages.
Examination Report for Indonesian Application No. P00201908524, mailed on Dec. 24, 2021, 5 pages.
Examination Report for Indonesian Application No. P00201908525, mailed on Dec. 24, 2021, 5 pages.
Examination Report No. 1 for Australian Application No. 2020294182, mailed on Mar. 5, 2022, 3 pages.
International Search Report and Written Opinion for Application No. PCT/US2019/049076, mailed on Dec. 18, 2019, 11 pages.
International Preliminary Report on Patentability for Application No. PCT/EP2018/057835 mailed on Oct. 10, 2019, 15 pages.
International Preliminary Report on Patentability for Application No. PCT/EP2018/057834, mailed on Oct. 10, 2019, 13 pages.
International Search Report and Written Opinion for Application No. PCT/EP2018/057834, mailed on Nov. 6, 2018, 20 pages.
International Search Report and Written Opinion received for PCT Patent Application No. PCT/EP2018/057835, mailed on Nov. 6, 2018, 26 pages.
Invitation to Pay Additional Fees received for PCT Patent Application No. PCT/EP2018/057835, mailed on Jul. 17, 2018, 20 pages.
Invitation to Pay Additional Fees with Partial International Search for Application No. PCT/EP2018/057834 mailed Jul. 13, 2018, 18 pages.

(56) References Cited

OTHER PUBLICATIONS

Office Action for Canadian Application No. 3,057,903, mailed on Dec. 15, 2020, 6 pages.
Office Action for Canadian Application No. 3,057,903, mailed on Aug. 30, 2021, 4 pages.
Office Action for Canadian Application No. 3,057,905, mailed on Jan. 20, 2021, 6 pages.
Office Action for Chinese Application No. 201880023195.8, mailed on Jun. 21, 2022, 4 pages.
Office Action for Chinese Application No. 2018800231958, mailed on Apr. 21, 2021, 17 pages.
Office Action for Chinese Application No. 2018800231958, mailed on Dec. 17, 2021, 10 pages.
Office Action for Japanese Application No. 2019-551462 mailed on Dec. 15, 2020, 4 pages.
Office Action for Japanese Application No. 2019-551471 mailed on Dec. 15, 2020, 8 pages.
Office Action for Japanese application No. 2019-551471, mailed on Apr. 20, 2021, 2 pages.
Office Action for Korean Application No. 10-2019-7032076, mailed on May 25, 2021, 4 pages.
Office Action for Korean Application No. 10-2020-7017740, mailed Feb. 8, 2022, 14 pages.
Office Action for Korean Application No. 10-2020-7017746, mailed Feb. 10, 2022, 25 pages.
Office Action mailed May 27, 2020 for Russian Application No. 2019134684, 8 pages.
Office Action received for Mexican Patent Application No. MX/a/2019/011801, mailed on Dec. 5, 2022, 5 pages.
Office Action received for Russian Patent Application No. 201910733, mailed on Apr. 24, 2023, 6 pages (Official Copy Only).
Notice of reasons for refusal from corresponding JP Application No. 2024-094547, mailed May 20, 2025, all pages cited in its entirety.

* cited by examiner

APPARATUS FOR A RESONANCE CIRCUIT

PRIORITY CLAIM

The present application is a continuation application of U.S. patent application Ser. No. 16/497,597, filed Sep. 25, 2019, which is a National Phase entry of PCT Application No. PCT/EP2018/057835, filed Mar. 27, 2018, which claims priority from GB Application No. 1705206.9, filed Mar. 31, 2017, each of which is hereby fully incorporated herein by reference.

TECHNICAL FIELD

The present disclosure relates to apparatus for use with an RLC resonance circuit, more specifically an RLC resonance circuit for inductive heating of a susceptor of an aerosol generating device.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

According to a first aspect of the present disclosure, there is provided apparatus for use with an RLC resonance circuit for inductive heating of a susceptor of an aerosol generating device, the apparatus being arranged to: determine a resonant frequency of the RLC resonance circuit; and determine, based on the determined resonant frequency, a first frequency for the RLC resonance circuit for causing the susceptor to be inductively heated, the first frequency being above or below the determined resonant frequency.

The first frequency may be for causing the susceptor to be inductively heated to a first degree at a given supply voltage, the first degree being less than a second degree, the second degree being that to which the susceptor is caused to be inductively heated, at the given supply voltage, when the RLC circuit is driven at the resonant frequency.

The apparatus may be arranged to control a drive frequency of the RLC resonance circuit to be at the determined first frequency in order to heat the susceptor.

The apparatus may be arranged to control the drive frequency to be held at the first frequency for a first period of time.

The apparatus may be arranged to control the drive frequency to be at one of a plurality of first frequencies each different from one another.

The apparatus may be arranged to control the drive frequency through the plurality of first frequencies in accordance with a sequence.

The apparatus is arranged to select the sequence from one of a plurality of predefined sequences.

The apparatus may be arranged to control the drive frequency such that each of the first frequencies in the sequence is closer to the resonant frequency than the previous first frequency in the sequence, or control the drive frequency such that each of the first frequencies in the sequence is further from the resonant frequency than the previous first frequency in the sequence.

The apparatus may be arranged to control the drive frequency to be held at one or more of the plurality of first frequencies for a respective one or more time periods.

The apparatus may be arranged to measure an electrical property of the RLC circuit as a function of the drive frequency; and determine the resonant frequency of the RLC circuit based on the measurement.

The apparatus may be arranged to determine the first frequency based on the measured electrical property of the RLC circuit as a function of the drive frequency at which the RLC circuit is driven.

The electrical property may be a voltage measured across an inductor of the RLC circuit, the inductor being for energy transfer to the susceptor.

The measurement of the electrical property may be a passive measurement.

The electrical property may be indicative of a current induced in a sense coil, the sense coil being for energy transfer from an inductor of the RLC circuit, the inductor being for energy transfer to the susceptor.

The electrical property may be indicative of a current induced in a pick-up coil, the pick-up coil being for energy transfer from a supply voltage element, the supply voltage element being for supplying voltage to a driving element, the driving element being for driving the RLC circuit.

The apparatus may be arranged to determine the resonant frequency of the RLC circuit and/or the first frequency substantially on start-up of the aerosol generating device and/or substantially on installation of a new and/or replacement susceptor into the aerosol generating device and/or substantially on installation of a new and/or replacement inductor into the aerosol generating device.

The apparatus may be arranged to determine a characteristic indicative of a bandwidth of a peak of a response of the RLC circuit, the peak corresponding to the resonant frequency; and determine the first frequency based on the determined characteristic.

The apparatus may comprise a driving element arranged to drive the RLC resonance circuit at one or more of a plurality of frequencies; wherein the apparatus is arranged to control the driving element to drive the RLC resonant circuit at the determined first frequency.

The driving element may comprise an H-Bridge driver.

The apparatus may further comprise the RLC resonance circuit.

According to a second aspect of the present disclosure, there is provided an aerosol generating device comprising: a susceptor arranged to heat an aerosol generating material thereby to generate an aerosol in use, the susceptor being arranged for inductive heating by an RLC resonance circuit; and the apparatus according to the first aspect.

The susceptor may comprise one or more of nickel and steel.

The susceptor may comprise a body having a nickel coating.

The nickel coating may have a thickness less than substantially 5 μm, or substantially in the range 2 μm to 3 μm.

The nickel coating may be electroplated on to the body.

The susceptor may be or comprise a sheet of mild steel.

The sheet of mild steel may have a thickness in the range of substantially 10 μm to substantially 50 μm, or may have a thickness of substantially 25 μm.

According to a third aspect of the present disclosure, there is provided a method for use with an RLC resonance circuit for inductive heating of a susceptor of an aerosol generating device, the method comprising: determining a resonant frequency of the RLC circuit; and determining a first frequency for the RLC resonance circuit for causing the susceptor to be inductively heated, the first frequency being above or below the determined resonant frequency.

The method may comprise controlling a drive frequency of the RLC resonance circuit to be at the determined first frequency in order to heat the susceptor.

According to a fourth aspect of the present disclosure, there is provided a computer program which, when executed on a processing system, causes the processing system to perform the method of according to the third aspect.

Further features and advantages of the disclosure will become apparent from the following description of preferred embodiments of the disclosure, given by way of example only, which is made with reference to the accompanying drawings.

DETAILED DESCRIPTION

Induction heating is a process of heating an electrically conducting object (or susceptor) by electromagnetic induction. An induction heater may comprise an electromagnet and a device for passing a varying electric current, such as an alternating electric current, through the electromagnet. The varying electric current in the electromagnet produces a varying magnetic field. The varying magnetic field penetrates a susceptor suitably positioned with respect to the electromagnet, generating eddy currents inside the susceptor. The susceptor has electrical resistance to the eddy currents, and hence the flow of the eddy currents against this resistance causes the susceptor to be heated by Joule heating. In cases whether the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

Electrical resonance occurs in an electric circuit at a particular resonant frequency when the imaginary parts of impedances or admittances of circuit elements cancel each other. One example of a circuit exhibiting electrical resonance is a RLC circuit, comprising a resistance (R) provided by a resistor, an inductance (L) provided by an inductor, and a capacitance (C) provided by a capacitor, connected in series. Resonance occurs in an RLC circuit because the collapsing magnetic field of the inductor generates an electric current in its windings that charges the capacitor, while the discharging capacitor provides an electric current that builds the magnetic field in the inductor. When the circuit is driven at the resonant frequency, the series impedance of the inductor and the capacitor is at a minimum, and circuit current is at a maximum.

Figure 1:
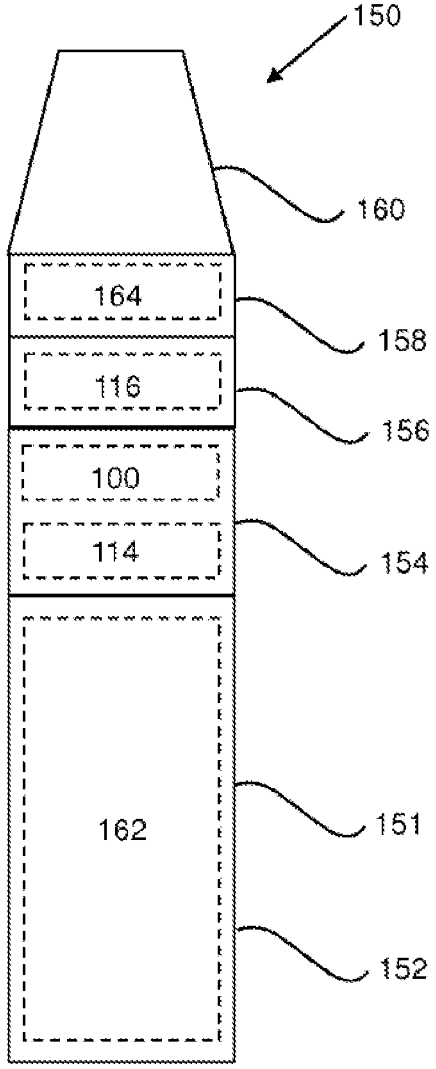
FIG. 1 illustrates schematically an aerosol generating device according to an example.

FIG. 1 illustrates schematically an example aerosol generating device 150 comprising an RLC resonance circuit 100 for inductive heating of an aerosol generating material 164 via a susceptor 116. In some examples, the susceptor 116 and the aerosol generating material 164 form an integral unit that may be inserted and/or removed from the aerosol generating device 150, and may be disposable. The aerosol generating device 150 is hand-held. The aerosol generating device 150 is arranged to heat the aerosol generating material 164 to generate aerosol for inhalation by a user.

It is noted that, as used herein, the term "aerosol generating material" includes materials that provide volatilized components upon heating, typically in the form of vapor or an aerosol. Aerosol generating material may be a non-tobacco-containing material or a tobacco-containing material. Aerosol generating material may, for example, include one or more of tobacco per se, tobacco derivatives, expanded tobacco, reconstituted tobacco, tobacco extract, homogenized tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol or propylene glycol.

Returning to FIG. 1, the aerosol generating device 150 comprises an outer body 151 housing the RLC resonance circuit 100, the susceptor 116, the aerosol generating material 164, a controller 114, and a battery 162. The battery is arranged to power the RLC resonance circuit 100. The controller 114 is arranged to control the RLC resonance circuit 100, for example control the voltage delivered to the RLC resonance circuit 100 from the battery 162, and the frequency f at which the RLC resonance circuit 100 is driven. The RLC resonance circuit 100 is arranged for inductive heating of the susceptor 116. The susceptor 116 is arranged to heat the aerosol generating material 364 to generate an aerosol in use. The outer body 151 comprises a mouthpiece 160 to allow aerosol generated in use to exit the device 150.

In use, a user may activate, for example via a button (not shown) or a puff detector (not shown) which is known per se, the controller 114 to cause the RLC resonance circuit 100 to be driven, for example at the resonant frequency $f_r$ of the RLC resonance circuit 100. The resonance circuit 100 thereby inductively heats the susceptor 116, which in turn heats the aerosol generating material 164, and causes the aerosol generating material 164 thereby to generate an aerosol. The aerosol is generated into air drawn into the device 150 from an air inlet (not shown), and is thereby carried to the mouthpiece 160, where the aerosol exits the device 150.

The controller 114 and the device 150 as a whole may be arranged to heat the aerosol generating material to a range of temperatures to volatilize at least one component of the aerosol generating material without combusting the aerosol generating material. For example, the temperature range may be about 50° C. to about 350° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some examples, the temperature range is between about 170° C. and about 220° C. In some examples, the temperature range may be other than this range, and the upper limit of the temperature range may be greater than 300° C.

It is desirable to control the degree to which the susceptor 116 is inductively heated, and hence the degree to which the susceptor 116 heats the aerosol generating material 164. For example, it may be useful to control the rate at which the susceptor 116 is heated and/or the extent to which the susceptor 116 is heated. For example, it may be useful to control heating of the aerosol generating material 164 (via the susceptor 116) according to a particular heating profile, for example in order to alter or enhance the characteristics of the aerosol generated, such as the nature, flavor and/or temperature, of the aerosol generated. As another example, it may be useful to control heating of the aerosol generating material 164 (via the susceptor 116) between different states, for example a 'holding' state where the aerosol generating medium is heated to a relatively low temperature which may be below the temperature at which the aerosol generating medium produces aerosol, and a 'heating' state where the aerosol generating material 164 is heated to a relatively high temperature at which the aerosol generating material 164 produces aerosol. This control may help reduce the time within which the aerosol generating device 150 can generate aerosol from a given activation signal. As a further example, it may be useful to control heating of the aerosol generating material 164 (via the susceptor 116) such that it does not exceed a certain extent for example to ensure that it is not heated beyond a certain temperature, for example so that it does not burn or char. For example, it may be desirable that the temperature of the susceptor 116 does not exceed 400° C., in order to ensure that the susceptor 116 does not cause the aerosol generating material 164 to burn or char. It will be appreciated that there may be a difference between the temperature of the susceptor 116 and the temperature of the aerosol generating material 164 as a whole, for example during heating up of the susceptor 116, for example where the rate of heating is large. It will therefore be appreciated that in some examples the temperature at which the susceptor 116 is controlled to be or which it should not exceed may be higher than the temperature to which the aerosol generating material 164 is desired to be heated to or which it should not exceed, for example.

One possible way of controlling the inductive heating of the susceptor 116 by the RLC resonance circuit 100 is to control a supply voltage that is provided to the circuit, which in turn may control the current flowing in the circuit 100, and hence may control the energy transferred to the susceptor 116 by the RLC resonance circuit 100, and hence the degree to which the susceptor 116 is heated. However, regulating the supply voltage would lead to increased cost, increased space requirements, and reduced efficiency due to losses in voltage regulating components.

According to examples of the present invention, an apparatus (for example the controller 114), is arranged to control the degree to which the susceptor 116 is heated by controlling a drive frequency f of the RLC resonance circuit 100. In broad overview, and as described in more detail below, the controller 114 is arranged to determine a resonant frequency $f_r$ of the RLC resonance circuit 100, for example by looking up the resonant frequency of the circuit 100, or by measuring it, for example. The controller 114 is arranged to then determine, based on the determined resonant frequency $f_r$, a first frequency for causing the susceptor to be inductively heated, the first frequency being above or below the determined resonant frequency $f_r$. The controller 114 is arranged to then control a drive frequency f of the RLC resonance circuit 100 to be at the determined first frequency in order to heat the susceptor 116. Since the first frequency is above or below the resonance frequency $f_r$ of the RLC resonance circuit 100 (i.e. is 'off resonance'), then driving the RLC circuit 100 at the first frequency will result in less current I flowing in the circuit 100 as compared to when driven at the resonant frequency $f_r$ for a given voltage, and hence the susceptor 116 will be inductively heated to a lesser degree as compared to when driven the circuit 100 is driven at the resonant frequency $f_r$ for the given voltage. Controlling the drive frequency of the resonant circuit to be at the first frequency therefore allows a control of the degree to which the susceptor 116 is heated without needing to control the voltage supplied to the circuit, and hence allows for a cheaper, more space and power efficient device 150.

Figure 2A:
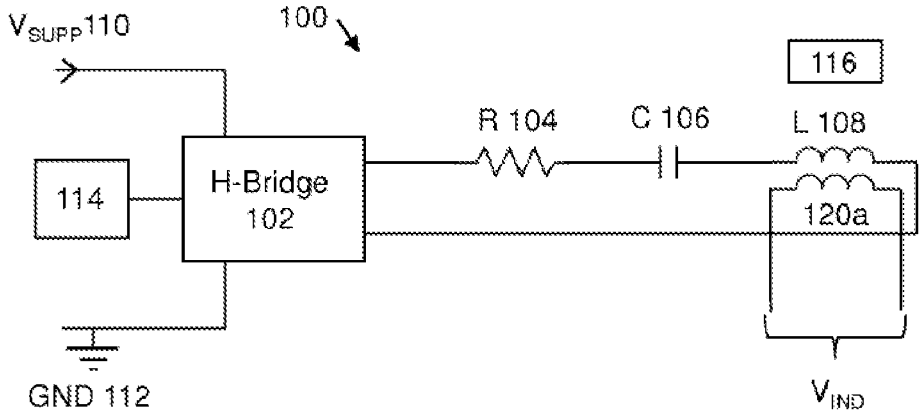
FIG. 2*a* illustrates schematically an RLC resonance circuit according to a first example.

Referring now to FIG. 2*a*, there is illustrated an example RLC resonance circuit 100 for inductive heating of the susceptor 116. The resonance circuit 100 comprises a resistor 104, a capacitor 106, and an inductor 108 connected in series. The resonance circuit 100 has a resistance R, an inductance L and a capacitance C.

The inductance L of the circuit 100 is provided by the inductor 108 arranged for inductive heating of the susceptor 116. The inductive heating of the susceptor 116 is via an alternating magnetic field generated by the inductor 108, which as mentioned above induces Joule heating and/or magnetic hysteresis losses in the susceptor 116. A portion of the inductance L of circuit 100 may be due to the magnetic permeability of the susceptor 116. The alternating magnetic field generated by the inductor 108 is generated by an alternating current flowing through the inductor 108. The alternating current flowing through the inductor 108 is an alternating current flowing through RLC resonance circuit 100. The inductor 108 may, for example, be in the form of a coiled wire, for example a copper coil. The inductor 108 may comprise, for example, a Litz wire, for example a wire comprising a number of individually insulated wires twisted together. Litz wires may be particularly useful when drive frequencies f in the MHz range are used, as this may reduce power loss due to the skin effect, as is known per se. At these relatively high frequencies, lower values of inductance are required. As another example, the inductor 108 may be a coiled track on a printed circuit board, for example. Using a coiled track on a printed circuit board may be useful as it provides for a rigid and self-supporting track, with a cross section which obviates any requirement for Litz wire (which may be expensive), which can be mass produced with a high reproducibility for low cost. Although one inductor 108 is shown, it will be readily appreciated that there may be more than one inductor arranged for inductive heating of one or more susceptors 116.

The capacitance C of the circuit 100 is provided by the capacitor 106. The capacitor 106 may be, for example, a Class 1 ceramic capacitor, for example a COG capacitor. The capacitance C may also comprise the stray capacitance of the circuit 100; however, this is or can be made negligible compared with the capacitance C provided by the capacitor 106.

The resistance R of the circuit 100 is provided by the resistor 104, the resistance of the track or wire connecting the components of the resonance circuit 100, the resistance of the inductor 108, and the resistance to current flowing the resonance circuit 100 provided by the susceptor 116 arranged for energy transfer with the inductor 108. It will be appreciated that the circuit 100 need not necessarily comprise a resistor 104, and that the resistance R in the circuit 100 may be provided by the resistance of the connecting track or wire, the inductor 108 and the susceptor 116.

The circuit 100 is driven by H-Bridge driver 102. The H-Bridge driver 102 is a driving element for providing an alternating current in the resonance circuit 100. The H-Bridge driver 102 is connected to a DC voltage supply $V_{SUPP}$ 110, and to an electrical ground GND 112. The DC voltage supply $V_{SUPP}$ 110 may be, for example, from the battery 162. The H-Bridge 102 may be an integrated circuit, or may comprise discrete switching components (not shown), which may be solid-state or mechanical. The H-bridge driver 102 may be, for example, a High-efficiency Bridge Rectifier. As is known per se, the H-Bridge driver 102 may provide an alternating current in the circuit 100 from the DC voltage supply $V_{SUPP}$ 110 by reversing (and then restoring) the voltage across the circuit via switching components (not shown). This may be useful as it allows the RLC resonance circuit to be powered by a DC battery, and allows the frequency of the alternating current to be controlled.

The H-Bridge driver 104 is connected to a controller 114. The controller 114 controls the H-Bridge 102 or components thereof (not shown) to provide an alternating current I in the RLC resonance circuit 100 at a given drive frequency f. For example, the drive frequency f may be in the MHz range, for example in the range 0.5 MHz to 4 MHz, for example in the range 2 MHz to 3 MHz. It will be appreciated that other frequencies f or frequency ranges may be used, for example depending on the particular resonance circuit 100 (and/or components thereof), controller 114, susceptor 116, and/or driving element 102 used. For example, it will be appreciated that the resonant frequency $f_r$ of the RLC circuit 100 is dependent on the inductance L and capacitance C of the circuit 100, which in turn is dependent on the inductor 108, capacitor 106 and susceptor 116. The range of drive frequencies f may be around the resonant frequency $f_r$ of the particular RLC circuit 100 and/or susceptor 116 used, for example. It will also be appreciated that resonance circuit 100 and/or drive frequency or range of drive frequencies f used may be selected based on other factors for a given susceptor 116. For example, in order to improve the transfer of energy from the inductor 108 to the susceptor 116, it may be useful to provide that the skin depth (i.e. the depth from the surface of the susceptor 116 within which the alternating magnetic field from the inductor 108 is absorbed) is less, for example a factor of two to three times less, than the thickness of the susceptor 116 material. The skin depth differs for different materials and construction of susceptors 116, and reduces with increasing drive frequency f. In some examples, therefore, it may be beneficial to use relatively high drive frequencies f. On the other hand, for example, in order to reduce the proportion of power supplied to the resonance circuit 100 and/or driving element 102 that is lost as heat within the electronics, it may be beneficial to use lower drive frequencies f. In some examples, a compromise between these factors may therefore be chose as appropriate and/or desired.

As mentioned above, the controller 114 is arranged to determine a resonant frequency $f_r$ of the RLC resonance circuit 100, and then determine the first frequency f at which the RLC resonance circuit 100 is to be controlled to be driven based on the determined resonant frequency $f_r$.

Figure 3A:
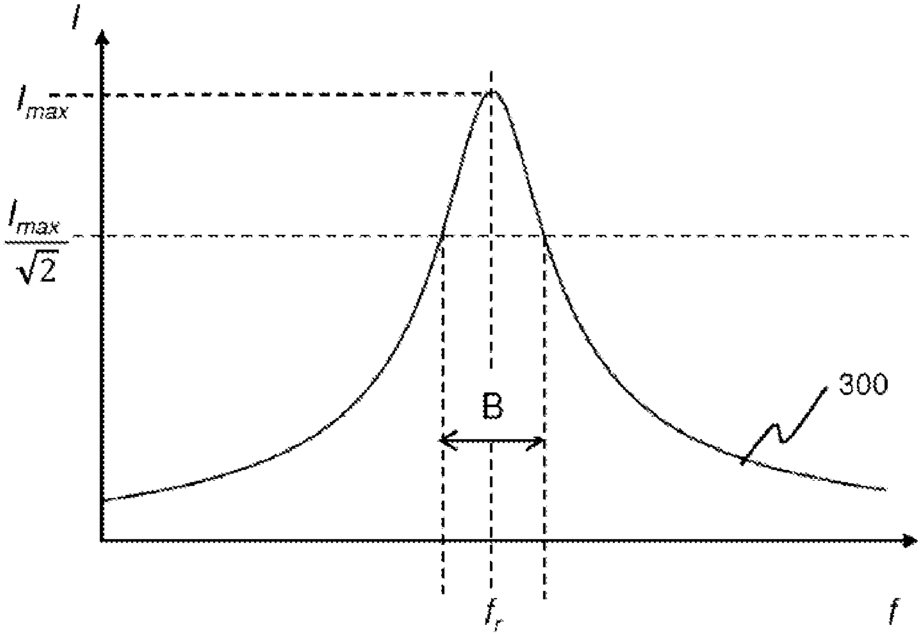
FIG. 3*a* illustrates schematically an example frequency response of an example RLC resonance circuit, indicating the resonant frequency.

FIG. 3*a* illustrates schematically a frequency response 300 of the resonance circuit 100. In the example of FIG. 3*a*, the frequency response 300 of the resonance circuit 100 is illustrated by a schematic plot of the current I flowing in the circuit 100 as a function of the drive frequency f at which the circuit is driven by the H-Bridge driver 104.

The resonance circuit 100 of FIG. 2*a* has a resonant frequency $f_r$ at which the series impedance Z of the inductor 108 and the capacitor 106 is at a minimum, and hence the circuit current I is maximum. Hence, as illustrated in FIG. 3*a*, when the H-Bridge driver 104 drives the circuit 100 at the resonant frequency $f_r$, the alternating current I in the circuit 100, and hence in the inductor 108, will be maximum $I_{max}$. The oscillating magnetic field generated by the inductor 106 will therefore be maximum, and hence the inductive heating of the susceptor 116 by the inductor 106 will be maximum. When the H-Bridge driver 104 drives the circuit 100 at a frequency f that is off-resonance, i.e. above or below the resonant frequency $f_r$, the alternating current I in the circuit 100, and hence the inductor 108, will be less than maximum, and hence the oscillating magnetic field generated by the inductor 106 will be less than maximum, and hence the inductive heating of the susceptor 116 by the inductor 106 will be less than maximum (for a given supply voltage $V_{SUPP}$ 110). As can be seen in FIG. 3*a* therefore, the frequency response 300 of the resonance circuit 100 has a peak, centered on the resonant frequency $f_r$, and tailing off at frequencies above and below the resonant frequency $f_r$.

As mentioned above, the controller 114 is arranged to determine the resonant frequency $f_r$ of the circuit 100.

In one example, the controller 114 is arranged to determine the resonant frequency $f_r$ of the circuit 100, by looking up the resonant frequency $f_r$, for example from a memory (not shown). For example, the resonant frequency $f_r$ of the circuit 100 may be calculated or measured or otherwise determined in advance and pre-stored in the memory (not shown), for example on manufacture of the device 150. In another example, the resonant frequency $f_r$ of the circuit 100 may be communicated to controller 114, for example from a user input (not shown), or from another device or input, for example. Using a pre-stored resonant frequency as the resonant frequency f of the circuit 100 on the basis of which the circuit is to be controlled allows for a simple control of the circuit 100. Even if the pre-stored resonant frequency is not exactly the same as the actual resonant frequency of the circuit 100, useful control on the basis of the pre-stored resonant frequency 100 may still be provided.

The resonant frequency $f_r$ of the circuit 100 (series RLC circuit) is dependent on the capacitance C and inductance L of the circuit 100, and is given by:

$$f_r = \frac{1}{\sqrt{LC}} \tag{1}$$

As mentioned above, the inductance L of the circuit 100 is provided by the inductor 108 arranged for inductive heating of the susceptor 116. At least portion of the inductance L of circuit 100 is due to the magnetic permeability of the susceptor 116. The inductance L, and hence resonant frequency $f_r$ of the circuit 100 may therefore depend on the specific susceptor(s) used and its positioning relative to the inductor(s) 108, which may change from time to time. Further, the magnetic permeability of the susceptor 116 may vary with varying temperatures of the susceptor 116. In some examples therefore, in order to determine the resonant frequency of the circuit 100 more accurately, it may be useful to measure the resonant frequency of the circuit 100.

In some examples, in order to determine the resonant frequency of the circuit 100, the controller 114 is arranged to measure a frequency response 300 of the RLC resonance circuit 100. For example, the controller may be arranged to measure an electrical property of the RLC circuit 100 as a function of the driving frequency f at which the RLC circuit is driven. The controller 114 may comprise a clock generator (not shown) to determine the absolute frequency at which the RLC circuit 100 is to be driven. The controller 114 may be arranged to control the H-bridge 104 to scan through a range of drive frequencies f over a period of time. The electrical property of the RLC circuit 100 may be measured during the scan of drive frequencies, and hence the frequency response 300 of the RLC circuit 100 as a function of the driving frequency f may be determined.

The measurement of the electrical property may be a passive measurement i.e. a measurement not involving any direct electrical contact with the resonance circuit 100.

For example, referring again to the example shown in FIG. 2*a*, the electrical property may be indicative of a current induced into a sense coil 120*a* by the inductor 108 of the RLC circuit 100. As illustrated in FIG. 2*a*, the sense coil 120*a* is positioned for energy transfer from the inductor 108, and is arranged to detect the current I flowing in the circuit 100. The sense coil 120*a* may be, for example, a coil of wire, or a track on a printed circuit board. For example, in the case the inductor 108 is a track on a printed circuit board, the sense coil 120*a* may be a track on a printed circuit board and positioned above or below the inductor 108, for example in a plane parallel to the plane of the inductor 108. As another example, in the example where there is more than one inductor 108, the sense coil 120*a* may be placed between the inductors 108, for energy transfer from both of the inductors. For example in the case of the inductors 108 being tracks on a printed circuit board and lying in a plane parallel to one another, the sense coil 120*a* may be a track on a printed circuit board in-between the two inductors, and in a plane parallel to the inductors 108. In any case, the alternating current I flowing in the circuit 100 and hence the inductor 108 causes the inductor 108 to generate an alternating magnetic field. The alternating magnetic field induces a current into the sense coil 120*a*. The current induced into the sense coil 120*a* produces a voltage $V_{IND}$ across the sense coil 120*a*. The voltage $V_{IND}$ across the sense coil 120*a* can be measured, and is proportional to the current I flowing in RLC circuit 100. The voltage $V_{IND}$ across the sense coil 120*a* may be recorded as a function of the drive frequency f at which the H-Bridge driver 104 is driving the resonance circuit 100, and hence a frequency response 300 of the circuit 100 determined. For example, the controller 114 may record a measurement of the voltage $V_{IND}$ across the sense coil 120*a* as a function of the frequency f at which it is controlling the H-Bridge driver 104 to drive the alternating current in the resonance circuit 100. The controller may then analyze the frequency response 300 to determine the resonant frequency $f_r$ about which the peak is centered, and hence the resonant frequency of the circuit 100.

Figure 2B:
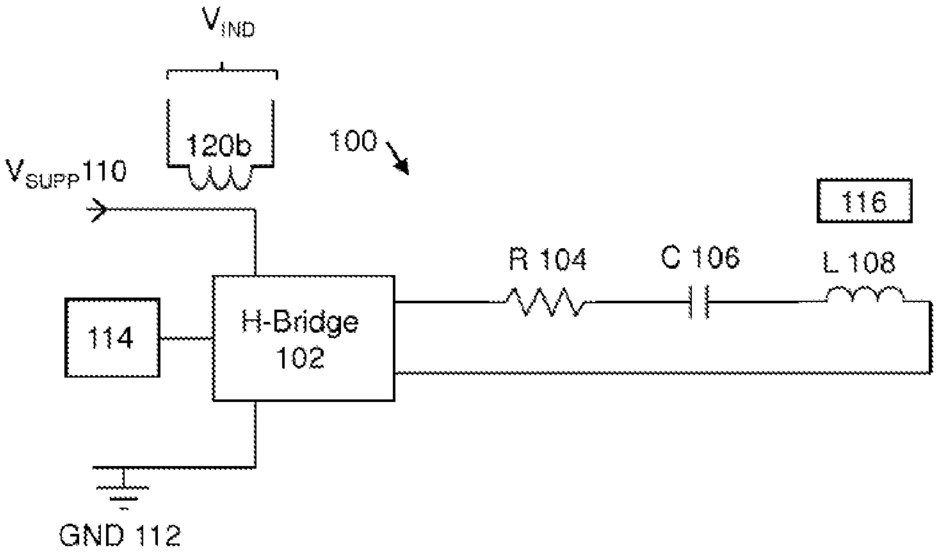
FIG. 2*b* illustrates schematically and RLC resonance circuit according to a second example.

FIG. 2*b* illustrates another example passive measurement of an electrical property of the RLC circuit 100. FIG. 2*b* is the same as FIG. 2*a* except in that the sense coil 120*a* of FIG. 2*a* is replaced by a pick-up coil 120*b*. As illustrated in FIG. 2*b*, the pick-up coil 120*b* is placed so as to intercept a portion of a magnetic field produced by the DC supply voltage wire or track 110 when the DC current flowing therethrough changes due to changing demands of the RLC circuit. The magnetic field produced by the changes in current flowing in the DC supply voltage wire or track 110 induces a current in the pick-up coil 120*b*, which produces a voltage $V_{IND}$ across the pick-up coil 120*b*. For example, although in an ideal case the current flowing in the DC supply voltage wire or track 110 would be direct current only, in practice the current flowing in the DC supply voltage wire or track 110 may be modulated to some extent by the H-Bridge driver 104, for example due to imperfections in the switching in the H-Bridge driver 104. These current modulations accordingly induce a current into the pick-up coil, which are detected via the voltage $V_{IND}$ across the pick-up coil 120*b*.

The voltage $V_{IND}$ across the pick-up coil 120*b* can be measured and recorded as a function of the drive frequency f at which the H-Bridge driver 104 is driving the resonance circuit 100, and hence a frequency response 300 of the circuit 100 determined. For example, the controller 114 may record a measurement of the voltage $V_{IND}$ across the pick-up coil 120*a* as a function of the frequency f at which it is controlling the H-Bridge driver 104 to drive the alternating current in the resonance circuit 100. The controller may then analyze the frequency response 300 to determine the resonant frequency $f_r$ about which the peak is centered and hence the resonant frequency of the circuit 100.

It is noted that in some examples it may be desirable to reduce or remove the modulated component of the current in the DC supply voltage wire or track 110 that may be caused by imperfections in the H-Bridge driver 104. This may be achieved, for example, by implementing a bypass capacitor (not shown) across the H-bridge driver 104. It will be appreciated that in this case, the electrical property of the RLC circuit 100 used to determine the frequency response 300 of the circuit 100 may be measured by means other than the pick-up coil 120*b*.

Figure 2C:
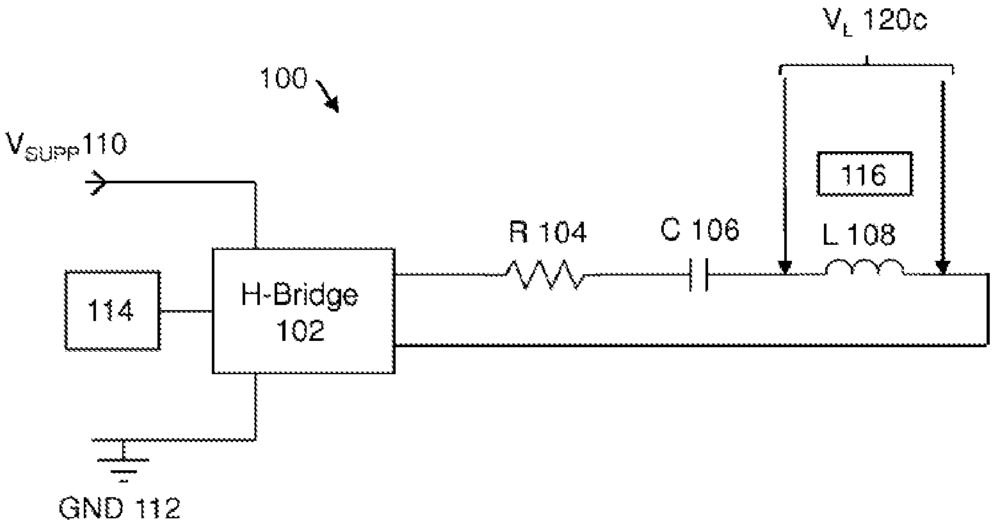
FIG. 2*c* illustrates schematically an RLC resonance circuit according to a third example.

FIG. 2*c* illustrates an example of an active measurement of an electrical property of the RLC circuit. FIG. 2*c* is the same as FIG. 2*a* except in that the sense coil 120*a* of FIG. 2*a* is replaced by an element 120*c*, for example a passive differential circuit 120*c*, arranged to measure the voltage $V_L$ across the inductor 108. As the current I in the resonance circuit 100 changes, the voltage $V_L$ across the inductor 108 will change. The voltage $V_L$ across the inductor 108 can be measured and recorded as a function of the drive frequency f at which the H-Bridge driver 104 drives the resonance circuit 100, and hence a frequency response 300 of the circuit 100 determined. For example, the controller 114 may record a measurement of the voltage $V_L$ across the inductor 108 as a function of the frequency f at which it is controlling the H-Bridge driver 104 to drive the alternating current in the resonance circuit 100. The controller 114 may then analyze the frequency response 300 to determine the resonant frequency $f_r$ about which the peak is centered, and hence the resonant frequency of the circuit 100.

In each of the examples illustrated in FIGS. 2*a* to 2*c*, or otherwise, the controller 114 may analyze the frequency response 300 to determine the resonant frequency $f_r$ about which the peak is centered. For example, the controller 114 may use known data analysis techniques to determine the resonant frequency from the frequency response. For example, the controller may infer the resonant frequency $f_r$ directly from the frequency response data. For example, the controller 114 may determine the frequency f at which the largest response was recorded as the resonant frequency $f_r$, or may determine the frequencies f for which the two largest responses were recorded and determine the average of these two frequencies f as the resonant frequency $f_r$. As yet another example, the controller 114 may fit a function describing current I (or another response such as impedance etc.) as a function of frequency f for an RLC circuit to the frequency response data, and infer or calculate from the fitted function the resonant frequency $f_r$.

Determining the resonant frequency $f_r$ based on a measurement of the frequency response of the RLC circuit 100 removes the need to rely on an assumed value of the resonant frequency for a given circuit 100, susceptor 1116, or susceptor temperature, and hence provides for a more accurate determination of the resonant frequency of the circuit 100, and hence for more accurate control of the frequency at which the resonance circuit 100 is to be driven. Further, the control is more robust to changes of the susceptor 116, or the resonance circuit 100, or the device as a whole 350. For example, changes in the resonant frequency of the resonance circuit 100 due to a change in temperature of the susceptor 116 (for example due to changes in the susceptor's magnetic permeability, and hence inductance L of the resonance circuit 100, with changing temperature of the susceptor 116), may be accounted for in the measurement.

In some examples, the susceptor 116 may be replaceable. For example, the susceptor 116 may be disposable and for example integrated with the aerosol generating material 164 that it is arranged to heat. The determination of the resonant frequency by measurement may therefore account for differences between different susceptors 116, and/or differences in the placement of the susceptor 116 relative to the inductor 108, as and when the susceptor 116 is replaced. Furthermore, the inductor 108, or indeed any component of the resonance circuit 100, may be replaceable, for example after a certain use, or after damage. Similarly, the determination of the resonant frequency may therefore account for differences between different inductors 108, and/or differences in the placement of the inductor 108 relative to the susceptor 116, as an when the inductor 108 is replaced.

Accordingly, the controller may be arranged to determine the resonant frequency of the RLC circuit 100 substantially on start-up of the aerosol generating device 150 and/or substantially on installation of a new and/or replacement susceptor 116 into the aerosol generating device 150 and/or substantially on installation of a new and/or replacement inductor 108 into the aerosol generating device 150.

As mentioned above, the controller 114 is arranged to determine, based on the determined resonant frequency, a first frequency f for causing the susceptor 116 to be inductively heated, the first frequency being above or below the determined resonant frequency (i.e. off resonance).

Figure 3B:
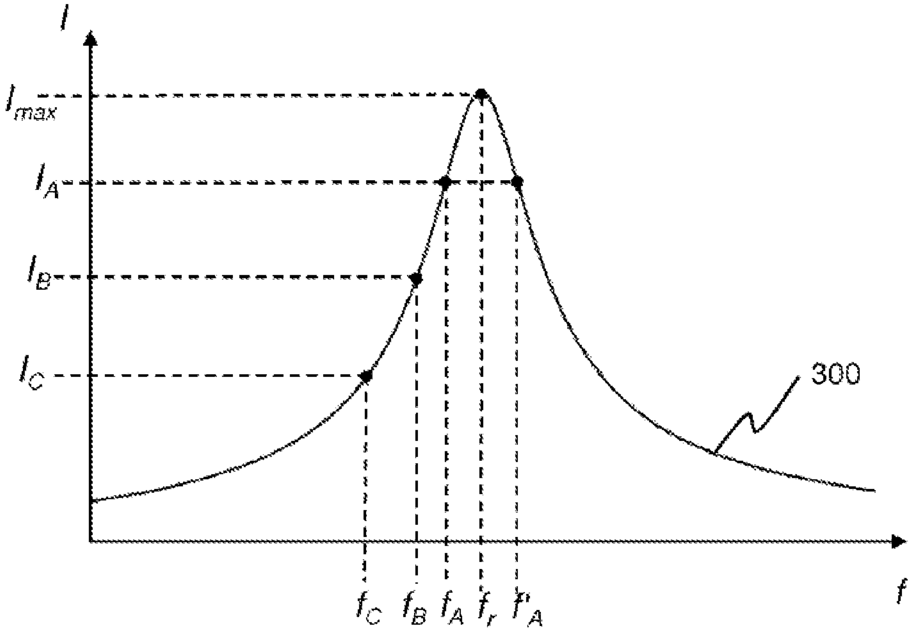
FIG. 3*b* illustrates schematically an example frequency response of an example RLC resonance circuit, indicating different driving frequencies.
Figure 3C:
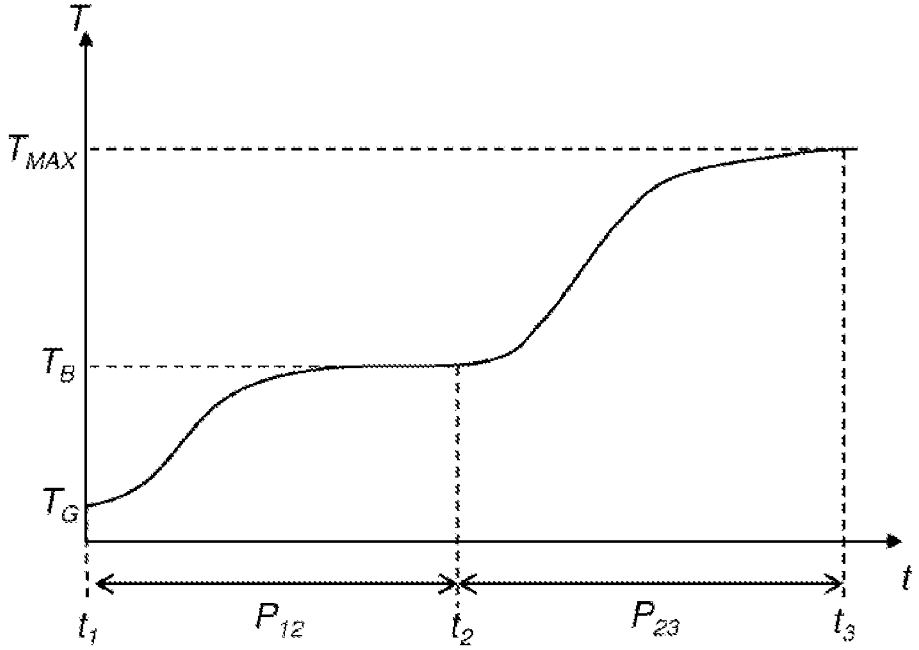
FIG. 3*c* illustrates schematically the temperature of a susceptor as a function of time, according to an example.

FIG. 3*b* illustrates schematically a frequency response 300 of the RLC resonance circuit 100, according to an example, with specific points (black circles) marked on the response 300 corresponding to different drive frequencies $f_A$, $f_B$, $f_c$, $f'_A$. In the example of FIG. 3*b*, the frequency response 300 of the resonance circuit 100 is illustrated by a schematic plot of the current I flowing in the circuit 100 as a function of the drive frequency f at which the circuit 100 is driven. The response 300 may correspond, for example, to the current I (or alternatively another electrical property) of the circuit 100 measured, for example by the controller 114, as a function of the drive frequency f at which the circuit 100 is driven. As illustrated in FIG. 3*b*, and as described above, the response 300 forms a peak centered around the resonant frequency $f_r$. When the resonance circuit 100 is driven at the resonant frequency $f_r$, the current I flowing in the resonance circuit 100 is maximum $I_{max}$ for a given supply voltage. When the resonance circuit is driven at a frequency $f_A$ that is above (e.g. higher than) the resonant frequency $f_r$, the current $I_A$ flowing in the resonance circuit 100 is less than the maximum $I_{max}$ for a given supply voltage. Similarly when the resonance circuit is driven at a frequency $f_A$, $f_B$, $f_c$ that is below (e.g. lower than) the resonant frequency $f_r$, the current $I_A$, $I_B$, $I_C$ flowing in the resonance circuit 100 is less than the maximum $I_{max}$ for a given supply voltage. Since there is less current I flowing in the resonance circuit when it is driven at one of the first frequencies $f_A$, $f_B$, $f_c$, $f'_A$ as compared to when the circuit is driven at the resonant frequency $f_r$, for a given supply voltage, then the energy transfer from the inductor 108 of the resonance circuit 110 to the susceptor 116 will be less, and hence the degree to which the susceptor 116 is inductively heated will be less, as compared to the degree to which the susceptor 116 is inductively heated when the circuit is driven at the resonant frequency $f_r$, for a given supply voltage. By controlling the resonance circuit 100 to be driven at one of the first frequencies $f_A$, $f_B$, $f_c$, $f'_A$ therefore, the controller can control the degree to which the susceptor 116 is heated.

As will be appreciated, the further away (above or below) the frequency at which the resonance circuit 100 is controlled to be driven is from the resonant frequency $f_r$, the less the degree to which susceptor 116 will be inductively heated. Nonetheless, at each of the first frequencies $f_A$, $f_B$, $f_c$, $f'_A$, energy is transferred from the inductor 108 of the circuit 100 to the susceptor 116, and the susceptor 116 is inductively heated.

In some examples, the controller 114 may determine one or more of the first frequencies $f_A$, $f_B$, $f_c$, $f'_A$ by adding or subtracting a pre-determined amount to or from the determined resonant frequency $f_r$, or by multiplying or dividing the resonant frequency $f_r$ by a pre-determined factor, or by any other operation, and control the resonance circuit 100 to be driven at this first frequency. The predetermined amount or factor or other operation may be set such that the susceptor 116 is still inductively heated when the resonance circuit 100 is driven at the first frequency $f_A$, $f_B$, $f_c$, $f'_A$, i.e. such that the first frequency $f_A$, $f_B$, $f_c$, $f'_A$ is not so far off resonance that the susceptor 116 is substantially not inductively heated. The pre-determined amount or factor or operation may be determined or calculated in advance, for example during manufacture, and stored in a memory (not shown) accessible by the controller 114, for example. For example, the response 300 of the circuit 100 may be measured in advance, and the operations resulting in first frequencies $f_A$, $f_B$, $f_c$, $f'_A$ which correspond to different current flow $I_A$, $I_B$, $I_C$ in the circuit 100 and hence different degrees of inductive heating of the susceptor 116, determined, and stored in a memory (not shown) accessible by the controller 114. The controller may then select an appropriate operation, and hence first frequency $f_A$, $f_B$, $f_c$, $f'_A$, in order to control the degree to which the susceptor 116 is inductively heated.

In other examples, as mentioned above, the controller 114 may determine the response 300 of the resonant circuit 100 as a function of the drive frequency f, for example by measuring and recording an electrical property of the circuit 100 as a function of the drive frequency f at which the circuit 100 is driven. As described above, this may be conducted on start-up of the device 150 or on replacement of component parts of the circuit 100, for example. This may alternatively or additionally be conducted during operation of the device. The controller 114 may then determine the first frequency $f_A$, $f_B$, $f_c$, $f'_A$ relative to the resonant frequency $f_r$, by analyzing the measured response 300, for example using techniques as described above. The controller 114 may then select the appropriate first frequency $f_A$, $f_B$, $f_c$, $f'_A$, in order to control the degree to which the susceptor 116 is inductively heated. Similarly to as described above, determining the first frequency based on a measured response of the resonant circuit 100 may allow a control that is more accurate and robust against changes within the device 150, such as replacement of component parts of the resonant circuit 100 or relative positioning thereof, as well as changes in the response 300 itself for example due to different temperatures or other conditions of the susceptor 116, resonance circuit 100, or device 150.

In some examples, the controller 114 may determine a characteristic indicative of a bandwidth of the peak of the response 300, and determine the first frequency $f_A$, $f_B$, $f_c$, $f'_A$ based on the determined characteristic. For example, the controller may determine the first frequency $f_A$, $f_B$, $f_c$, $f'_A$ based on a bandwidth B of the peak of the response 300. As illustrated in FIG. 3*a*, the bandwidth B of the peak is the full width of the peak in Hz at $I_{max}/\sqrt{2}$. The characteristic indicative of the bandwidth B of the peak of the response 300 of the resonance circuit 100 may be determined in advance, for example during manufacture of the device, and pre-stored in a memory (not shown) accessible by the controller 114. The characteristic is indicative of the width of the peak of the response 300. Accordingly, use of this characteristic may provide a simple way for the controller 114 to determine a first frequency that will result in a given degree of inductive heating relative to the maximum at the resonant frequency $f_r$, without analyzing the response 300. For example, the controller 114 may determine the first frequency for example by adding or subtracting from the determined resonant frequency $f_r$ a proportion or multiple of the characteristic indicative of the bandwidth B. For example, the controller 114 may determine the first frequency by taking the determined resonant frequency $f_r$ and adding or subtracting from the determined resonant frequency $f_r$ a frequency that is half of the bandwidth B. As can be seen from FIG. 3*a*, this would result in a current I flowing in the circuit of $I_{max}/\sqrt{2}$, and hence a reduction of the degree to which the susceptor 116 is heated as compared to when the circuit 100 is driven at the resonant frequency, for a given voltage.

It will be appreciated that in other examples, the controller 114 may determine the characteristic indicative of the bandwidth B from analyzing the response 300 of the circuit 100, for example from a measurement of an electrical property of the circuit 100 as a function of the drive frequency f at which the circuit 100 is driven, as described above.

The determined first frequency $f_A$, $f_B$, $f_c$, $f'_A$ at which the circuit 100 is controlled to be driven is above or below the resonant frequency $f_r$ (i.e. off-resonance), and hence the degree to which the susceptor 116 is inductively heated by the resonance circuit 100 is less than as compared to when driven at the resonant frequency $f_r$, for a given supply voltage. Control of the degree to which the susceptor 116 is inductively heated is thereby achieved.

As mentioned above, it may be useful to control the rate at which the susceptor 116 is heated and/or the extent to which the susceptor 116 is heated. To achieve this, the controller 114 may control the drive frequency f of the resonant circuit 100 to be at one of a plurality of first frequencies $f_A$, $f_B$, $f_c$, $f'_A$ each different from one another. For example, the plurality of first frequencies $f_A$, $f_B$, $f_c$, $f'_A$ may each be determined by the controller 114, and then an appropriate one of the plurality of first frequencies $f_A$, $f_B$, $f_c$, $f'_A$ selected, according to the desired degree to which the susceptor 116 (and hence aerosol generating material 164) is to be heated.

As mentioned above, it may be useful to control heating of the aerosol generating material 164 (via the susceptor 116) according to a particular heating profile for example in order to alter or enhance the characteristics of the aerosol generated, such as the nature, flavour and/or temperature, of the aerosol generated. To achieve this, the controller 114 may control the drive frequency f of the resonance circuit 100 sequentially through the plurality of first frequencies in accordance with a sequence. For example, the sequence may correspond to a heating sequence, where the degree to which the susceptor 116 is inductively heated is increased through the sequence. For example, the controller 114 may control the drive frequency f at which the resonant circuit 100 is driven such that each of the first frequencies in the sequence is closer to the resonant frequency than the previous first frequency in the sequence. For example, referring to FIG. 3*b*, the sequence may be first frequency $f_c$ followed by first frequency $f_B$ followed by first frequency $f_A$, where $f_A$ is closer to the resonant frequency $f_r$ than is $f_B$, and $f_B$ is closer to the resonant frequency $f_r$ than is $f_C$. In this case, the current I flowing in the resonant circuit 100 will accordingly be $I_C$ followed by $I_B$ followed by $I_A$, where $I_C$ is less than $I_B$ which is in turn less than $I_A$. As a result, the degree to which the susceptor 116 is inductively heated increases as a function of time. This may be useful to control and hence tailor the temporal heating profile of the aerosol generating material 164, and hence tailor the aerosol delivery, for example. The device 150 is therefore more flexible. For example, the sequence may correspond to a heating sequence, where the degree to which the susceptor 116 is inductively heated is increased through the sequence. As another example, the controller 114 may control the drive frequency f at which the resonant circuit 100 is driven such that each of the first frequencies in the sequence is further from the resonant frequency than the previous first frequency in the sequence. For example, referring to FIG. 3*b*, the sequence may be first frequency $f_A$ followed by first frequency $f_B$ followed by first frequency $f_C$, and hence the current I flowing in the resonant circuit 100 will accordingly be $I_A$ followed by $I_B$ followed by $I_C$, where $I_C$ is less than $I_B$ which is in turn less than $I_A$. As a result, the degree to which the susceptor 116 is inductively heated decreases as a function of time. This may be useful to reduce the temperature of the susceptor 116 or aerosol generating medium 164 in a more controlled manner, for example. Although in the sequences mentioned above, each frequency in the sequence was closer (or further) from the resonant frequency than the last, it will be appreciated that this need not necessarily be the case, and other sequences may be followed comprising any order of a plurality of first frequencies as desired.

In some examples, the controller 114 may select a sequence of a plurality of first frequencies $f_A$, $f_B$, $f_c$, $f'_A$ from a plurality of predefined sequences, for example stored on a memory (not shown) accessible by the controller 114. The sequence may be, for example, the heating sequence or the cooling sequence mentioned above, or any other predefined sequence. The controller 114 may determine which of the plurality of sequences to select based on, for example, user input such as a heating or cooling mode selection, the type of susceptor 116 or aerosol generating medium 164 being used (as identified by user input or from another identification means, for example), operational inputs from the overall device 150 such as a temperature of the susceptor 116 or aerosol generating medium 164 etc. This may be useful to control and hence tailor the temporal heating profile of the aerosol generating material 164 according to user desire or operational circumstance, and allows for a more flexible device 150.

In some examples, the controller 114 may control the drive frequency f to be held at a first frequency $f_A$, $f_B$, $f_c$, $f'_A$ for a first period of time. In some examples, the controller 114 may control the first frequency f to be held at one or more of the plurality of first frequencies $f_A$, $f_B$, $f_c$, $f'_A$ for a respective one or more time periods. This allows for further tailoring and flexibility of the heating profile of the susceptor 116 and aerosol generating material 164.

As a specific example, it may be useful to control heating of the aerosol generating material 164 (via the susceptor 116) between different states or modes, for example a 'holding' state where the aerosol generating material 164 is heated to a relatively low 'holding' or 'pre-heating' degree for a period of time, and a 'heating' state where the aerosol generating material 164 is heated to a relatively high degree for a period of time. As explained below, control between such states may help reduce the time within which the aerosol generating device 150 can generate a substantial amount of aerosol from a given activation signal.

A specific example is illustrated schematically in FIG. 3*b*, which illustrates schematically a plot of temperature T of the susceptor 116 (or aerosol generating material 164) as a function of time t, according to an example. Before a time $t_1$, the device 150 may be in an 'off' state, i.e. no current flows in the resonance circuit 100. The temperature of the susceptor 116 may therefore be an ambient temperature TG, for example 21° C. At the time $t_1$, the device 150 is switched to an 'on' state, for example by a user turning the device 150 on. The controller 114 controls the circuit 100 to be driven at a first frequency $f_B$. The controller 114 holds the drive frequency f at the first frequency $f_B$ for a time period $P_{12}$. The time period $P_{12}$ may be an open-ended period in the sense that it endures until a further input is received by the controller 114 at a time $t_2$, as described below. The circuit 100 being driven at the first frequency $f_B$ causes an alternating current $I_B$ to flow in the circuit 100, and hence the inductor 108, and hence for the susceptor 116 to be inductively heated. As the susceptor 116 is inductively heated, its temperature (and hence the temperature of the aerosol generating material 164) increases over the time period $P_{12}$. In this example, the susceptor 116 (and aerosol generating material 164) is heated in the period $P_{12}$ such that it reaches a steady temperature $T_B$. The temperature $T_B$ may be a temperature which is above the ambient temperature TG, but below a temperature at which a substantial amount of aerosol is generated by the aerosol generating material 164. The temperature $T_B$ may be 100° C. for example. The device 150 is therefore in a 'pre-heating' or 'holding' state or mode, wherein the aerosol generating material 164 is heated, but aerosol is substantially not being produced, or a substantial amount of aerosol is not being produced. At a time $t_2$, the controller 114 receives an input, such as an activation signal. The activation signal may result from a user pushing a button (not shown) of the device 150 or from a puff detector (not shown), which is known per se. On receipt of the activation signal, the controller 114 may control the circuit 100 to be driven at the resonant frequency $f_r$. The controller 114 holds the drive frequency f at the resonant frequency $f_r$ for a time period $P_{23}$. The time period $P_{23}$ may be an open-ended period in the sense that it endures until a further input is received by the controller 114 at a time $t_3$, for example until the user no longer pushes the button (not shown), or the puff detector (not shown) is no longer activated, or until a maximum heating duration has elapsed. The circuit 100 being driven at the resonant frequency $f_r$ causes an alternating current $I_{MAX}$ to flow in the circuit 100 and the inductor 108, and hence for the susceptor 116 to be inductively heated to a maximum degree, for a given voltage. As the susceptor 116 is inductively heated to the maximum degree, its temperature (and hence the temperature of the aerosol generating material 164) increases over the time period $P_{23}$. In this example, the susceptor 116 (and aerosol generating material 164) is heated in the period $P_{23}$ such that it reaches a steady temperature $T_{MAX}$. The temperature $T_{MAX}$ may be a temperature which is above the 'pre-heating' temperature $T_B$, and substantially at or above a temperature at which a substantial amount of aerosol is generated by the aerosol generating material 164. The temperature $T_{MAX}$ may be 300° C. for example (although of course may be a different temperature depending on the material 164, susceptor 116, the arrangement of the overall device 105, and/or other requirements and/or conditions). The device 150 is therefore in a 'heating' state or mode, wherein the aerosol generating material 164 reaches a temperature at which aerosol is substantially being produced, or a substantial amount of aerosol is being produced. Since the aerosol generating material 164 is already pre-heated, the time taken from the activation signal for the device 150 to produce a substantial amount of aerosol is therefore reduced as compared to the case where no 'pre-heating' or 'holding' state is applied. The device 150 is therefore more responsive.

Although in the above example the controller 114 controlled the resonance circuit 100 to be driven at the resonance frequency on $f_r$ on receipt of the activation signal, in other examples the controller 114 may control the resonance circuit 100 to be driven at first frequency $f_A$, $f_c$, closer to the resonance frequency $f_r$ than the first frequency $f_B$ of the 'pre-heating' mode or state.

In some examples, the susceptor 116 may comprise nickel. For example the susceptor 116 may comprise a body or substrate having a thin nickel coating. For example, the body may be a sheet of mild steel with a thickness of about 25 μm. In other examples, the sheet may be made of a different material such as aluminum or plastic or stainless steel or other non-magnetic materials and/or may have a different thickness, such as a thickness of between 10 μm and 50 μm. The body may be coated or electroplated with nickel. The nickel may for example have a thickness of less than 5 μm, such as between 2 μm and 3 μm. The coating or electroplating may be of another material. Providing the susceptor 116 with only a relatively small thickness may help to reduce the time required to heat the susceptor 116 in use. A sheet form of the susceptor 116 may allow a high degree of efficiency of heat coupling from the susceptor 116 to the aerosol generating material 164. The susceptor 116 may be integrated into a consumable comprising the aerosol generating material 164. A thin sheet of susceptor 116 material may be particularly useful for this purpose. The susceptor 116 may be disposable. Such a susceptor 116 may be cost effective. In one example, the nickel coated or plated susceptor 116 may be heated to temperatures in the range of about 200° C. to about 300° C., which may be the working range of the aerosol generating device 150.

In some examples, the susceptor 116 may be or comprise steel. The susceptor 116 may be a sheet of mild steel with a thickness of between about 10 μm and about 50 μm, for example a thickness of about 25 μm. Providing the susceptor 116 with only a relatively small thickness may help to reduce the time required to heat the susceptor in use. The susceptor 116 may be integrated into the apparatus 105, for example as opposed to being integrated with the aerosol generating material 164, which aerosol generating material 164 may be disposable. Nonetheless, the susceptor 116 may be removable from the apparatus 115, for example to enable replacement of the susceptor 116 after use, for example after degradation due to thermal and oxidation stress over use. The susceptor 116 may therefore be "semi-permanent", in that it is to be replaced infrequently. Mild steel sheets or foils or nickel coated steel sheets or foils as susceptors 116 may be particularly suited to this purpose as they are durable and hence, for example, may resist damage over multiple uses and/or multiple contact with aerosol generating material 164, for example. A sheet form of the susceptor 116 may allow a high degree of efficiency of heat coupling from the susceptor 116 to the aerosol generating material 164.

The Curie temperature $T_c$ of iron is 770° C. The Curie temperature $T_c$ of mild steel may be around 770° C. The Curie temperature $T_c$ of cobalt is 1127° C. In one example, the mild steel susceptor 116 may be heated to temperatures in the range of about 200° C. to about 300° C., which may be the working range of the aerosol generating device 150. The susceptor 116 having a Curie temperature $T_c$ that is remote from the working range of temperatures of the susceptor 116 in the device 150 may be useful as in this case changes to the response 300 of the circuit 100 may be relatively small over the working range of temperatures of the susceptor 116. For example, the change in saturation magnetization of a susceptor material such as mild steel at 250° C. may be relatively small, for example less than 10% relative to the value at ambient temperatures, and hence the resulting change in inductance L, and hence resonant frequency $f_r$, of the circuit 100 at different temperatures in the example working range may be relatively small. This may allow for the determined resonant frequency $f_r$ to be accurately based on a pre-determined value, and hence for simpler control.

Figure 4:
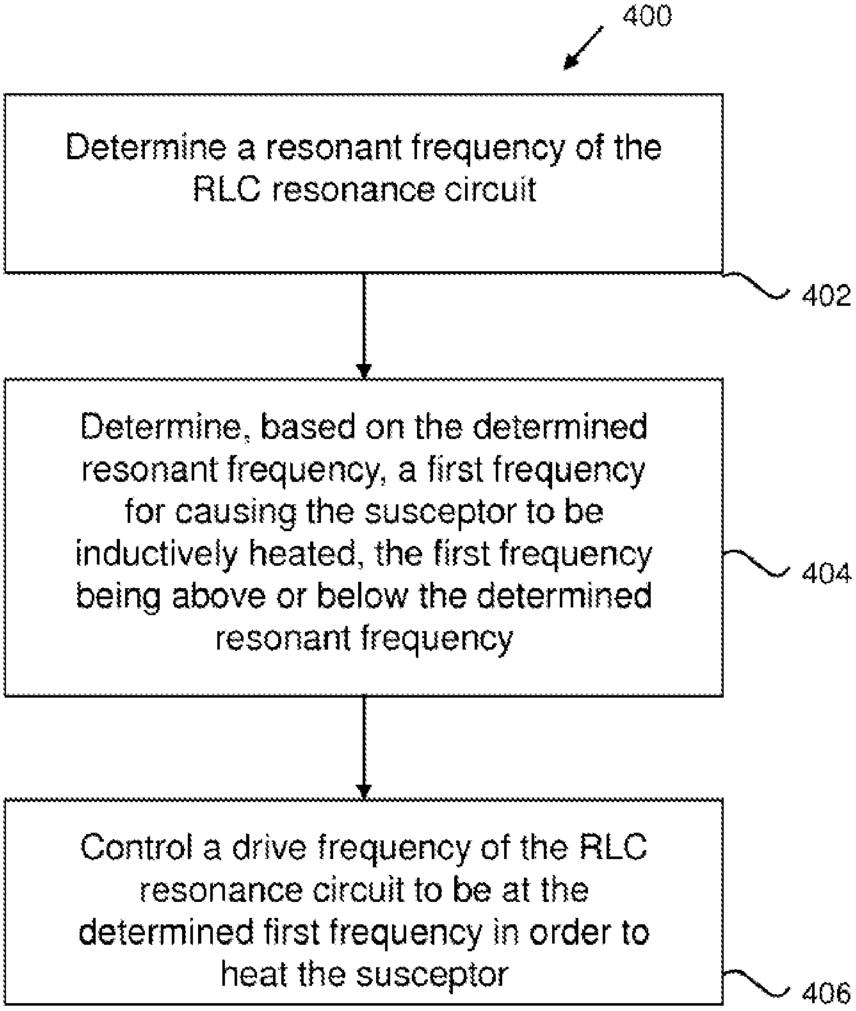
FIG. 4 is a flow diagram illustrating schematically an example method.

FIG. 4 is a flow diagram schematically illustrating a method 400 of controlling the RLC resonance circuit 100 for inductive heating of the susceptor 116 of the aerosol generating device 150. In 402, the method 400 comprises determining a resonant frequency $f_r$ of the RLC circuit 100, for example by looking it up from a memory, or by measuring it. In 404, the method 400 comprises determining a first frequency $f_A$, $f_B$, $f_c$, $f'_A$ for causing the susceptor 116 to be inductively heated, the first frequency being above or below the determined resonant frequency $f_r$. For example, the determination may be by adding or subtracting a pre-stored amount from the resonant frequency $f_r$, or based on a measurement of the frequency response of the circuit 100. In 406, the method 400 comprises controlling a drive frequency f of the RLC resonance circuit 100 to be at the determined first frequency $f_A$, $f_B$, $f_c$, $f'_A$ in order to heat the susceptor 116. For example, the controller 114 may send a control signal to the H-Bridge driver 114 to drive the RLC circuit 100 at the first frequency $f_A$, $f_B$, $f_c$, $f'_A$.

The controller 114 may comprise a processor and a memory (not shown). The memory may store instructions executable by the processor. For example, the memory may store instructions which, when executed on the processor, may cause the processor to perform the method 400 described above, and/or to perform the functionality of any one or combination of the examples described above. The instructions may be stored on any suitable storage medium, for example, on a non-transitory storage medium.

Although some of the above examples referred to the frequency response 300 of the RLC resonance circuit 100 in terms of a current I flowing in the RLC resonance circuit 100 as a function of the frequency f at which the circuit is driven, it will be appreciated that this need not necessarily be the case, and in other examples the frequency response 300 of the RLC circuit 100 may be any measure relatable to the current I flowing in the RLC resonance circuit as a function of the frequency f at which the circuit is driven. For example the frequency response 300 may be a response of an impedance of the circuit to frequency f, or as described above may be a voltage measured across the inductor, or a voltage or current resulting from the induction of current into a pick-up coil by a change in current flowing in a supply voltage line or track to the resonance circuit, or a voltage or current resulting from the induction of current into a sense coil by the inductor 108 of the RLC resonance circuit, or a signal from a non-inductive pick up coil or non-inductive filed sensor such a s a Hall effect device, as a function of the frequency f at which the circuit is driven. In each case, a frequency characteristic of a peak of the frequency response 300 may be determined.

Although in some of the above examples the Bandwidth B of the peak of the response 300 was referred to, it will be appreciated that any other indicator of the width of the peak of the response 300 may be used instead. For example, the full width or half-width of the peak at an arbitrary predetermined response amplitude, or fraction of a maximum response amplitude, may be used. It will also be appreciated that in other examples, the so called "Q" or "Quality" factor or value of the resonance circuit 100, which may be related to the bandwidth B and the resonant frequency $f_r$ of the resonance circuit 100 via $Q=f_r/B$, may be determined and/or or measured and used in place of the bandwidth B and/or resonant frequency $f_r$, similarly to as described in the examples above with appropriate factors applied. It will therefore be appreciated that in some examples the Q factor of the circuit 100 may be measured or determined, and the resonant frequency $f_r$ of the circuit 100, bandwidth B of the circuit 100, and/or the first frequency at which the circuit 100 is driven may be determined based on the determined Q factor accordingly.

Although the above examples referred to a peak as associated with a maximum, it will be readily appreciated the this need not necessarily be the case and that, depending on the frequency response 300 determined and the way in which it is measured, the peak may be associated with a minimum. For example, at resonance, the impedance of the RLC circuit 100 is minimum, and hence in cases where the impedance as a function of drive frequency f is used as a frequency response 300 for example, the peak of the frequency response 300 of the RLC circuit will be associated with a minimum.

Although in some of the above examples it is described that the controller 114 is arranged to measure a frequency response 300 of the RLC resonance circuit 100, it will be appreciated that in other examples the controller 114 may determine the resonant frequency or first frequency by analyzing frequency response data communicated to it by a separate measurement or control system (not shown), or may determine the resonant frequency or first frequency directly by being communicated them by a separate control or measurement system, for example. The controller 114 may then control the frequency at which the RLC circuit 100 is driven to the first frequency so determined.

Although in some of the above examples, it is described that the controller 114 is arranged to determine the first frequency and control the frequency at which the resonance circuit is driven, it will be appreciated that this need not necessarily be the case, and in other examples an apparatus that need not necessarily be or comprise the controller 114 may be arranged to determine the first frequency and control the frequency at which the resonance circuit is driven. The apparatus may be arranged to determine the first frequency, for example by the methods described above. The apparatus may be arranged to send a control signal, for example to the H-Bridge driver 102, to control the resonance circuit 100 to be driven at the first frequency so determined. It will be appreciated that this apparatus or the controller 114 need not necessarily be an integral part of the aerosol generating device 150, and may, for example, be a separate apparatus or controller 114 for use with the aerosol generating device 150. Further, it will be appreciated that the apparatus or controller 114 need not necessarily be for controlling the resonance circuit, and/or need not necessarily be arranged to control the frequency at which the resonance circuit is driven, and that in other examples the apparatus or controller 114 may be arranged to determine the first frequency but not itself control the resonance circuit. For example, having determined the first frequency, the apparatus or controller 114 may send this information or information indicating the determined first frequency to a separate controller (not shown), or the separate controller (not shown) may obtain the information or indication from the apparatus or controller 114, which separate controller (not shown) may then control the frequency at which the resonance circuit is driven based on this information or indication, for example control the frequency at which the resonance circuit is driven to be at the first frequency, for example control the H-Bridge driver 102 to drive the resonance circuit at the first frequency.

Although in the above examples it is described that the apparatus or controller 114 is for use with an RLC resonance circuit for inductive heating of a susceptor of an aerosol generating device, this need not necessarily be the case and in other examples the apparatus or controller 114 may be for use with an RLC resonance circuit for inductive heating of a susceptor of any device, for example any inductive heating device.

Although in the above examples it is described that the RLC resonance circuit 100 is driven by the H-Bridge driver 102, this need not necessarily be the case, and in other examples the RLC resonance circuit 100 may be driven by any suitable driving element for providing an alternating current in the resonance circuit 100, such as an oscillator or the like.

The above examples are to be understood as illustrative examples of the invention. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

The invention claimed is:

1. An aerosol generating device comprising:

an RLC resonance circuit for inductive heating of a susceptor received in the aerosol generating device in use; and a controller being arranged to, in use:

determine a resonant frequency of the RLC resonance circuit;

determine, based on the determined resonant frequency, a first frequency for the RLC resonance circuit for causing the susceptor to be inductively heated, the first frequency being above or below the determined resonant frequency; and control a drive frequency of the RLC resonance circuit to be at the determined first frequency in order to heat the susceptor.

2. The aerosol generating device according to claim 1, wherein the first frequency is for causing the susceptor to be inductively heated to a first degree at a given supply voltage, the first degree being less than a second degree, the second degree being that to which the susceptor is caused to be inductively heated, at the given supply voltage, when the RLC circuit is driven at the resonant frequency.

3. The aerosol generating device according to claim 1, wherein the controller is arranged to:

control the drive frequency to be held at the first frequency for a first period of time.

4. The aerosol generating device according to claim 1, wherein the controller is arranged to: control the drive frequency to be at one of a plurality of first frequencies each different from one another.

5. The aerosol generating device according to claim 4, wherein the controller is arranged to: control the drive frequency through the plurality of first frequencies in accordance with a sequence.

6. The aerosol generating device according to claim 5, wherein the controller is arranged to:

select the sequence from one of a plurality of predefined sequences.

7. The aerosol generating device according to claim 5, wherein the controller is arranged to:

control the drive frequency such that each of the first frequencies in the sequence is closer to the resonant frequency than the previous first frequency in the sequence, or control the drive frequency such that each of the first frequencies in the sequence is further from the resonant frequency than the previous first frequency in the sequence.

8. The aerosol generating device according to claim 4, wherein the controller is arranged to:

control the drive frequency to be held at one or more of the plurality of first frequencies for a respective one or more time periods.

9. The aerosol generating device according to claim 1, wherein the controller is arranged to:

measure an electrical property of the RLC circuit as a function of the drive frequency; and determine the resonant frequency of the RLC circuit based on the measurement.

10. The aerosol generating device according to claim 9, wherein the controller is arranged to:

determine the first frequency based on the measured electrical property of the RLC circuit as a function of the drive frequency at which the RLC circuit is driven.

11. The aerosol generating device according to claim 9, wherein the electrical property is a voltage measured across an inductor of the RLC circuit, the inductor being for energy transfer to the susceptor.

12. The aerosol generating device according to claim 9, wherein the measurement of the electrical property is a passive measurement.

13. The aerosol generating device according to claim 12, wherein the electrical property is indicative of a current induced in a sense coil, the sense coil being for energy transfer from an inductor of the RLC circuit, the inductor being for energy transfer to the susceptor.

14. The aerosol generating device according to claim 12, wherein the electrical property is indicative of a current induced in a pick-up coil, the pick-up coil being for energy transfer from a supply voltage element, the supply voltage element being for supplying voltage to a driving element, the driving element being for driving the RLC circuit.

15. The aerosol generating device according to claim 1, wherein the controller is arranged to:

determine the resonant frequency of the RLC circuit or the first frequency on start-up of the aerosol generating device and/or substantially on installation of a new or replacement susceptor into the aerosol generating device and/or on installation of a new or replacement inductor into the aerosol generating device.

16. The aerosol generating device according to claim 1, wherein the controller is arranged to:

determine a characteristic indicative of a bandwidth of a peak of a response of the RLC circuit, the peak corresponding to the resonant frequency; and determine the first frequency based on the determined characteristic.

17. The aerosol generating device according to claim 1, wherein the controller comprises:

a driving element arranged to drive the RLC resonance circuit at one or more of a plurality of frequencies;

wherein the controller is arranged to control the driving element to drive the RLC resonant circuit at the determined first frequency.

18. The aerosol generating device according to claim 17, wherein the driving element comprises a H-Bridge driver.

19. The aerosol generating device according to claim 1, comprising:

a said susceptor arranged to heat an aerosol generating material thereby to generate an aerosol in use, the susceptor being arranged for inductive heating by the RLC resonance circuit.

20. The aerosol generating device according to claim 19, wherein the susceptor comprises one or more of nickel and steel.

21. The aerosol generating device according to claim 20, wherein the susceptor comprises a body having a nickel coating.

22. The aerosol generating device according to claim 21, wherein the nickel coating is electroplated on to the body.

23. The aerosol generating device according to claim 20, wherein the nickel coating has a thickness less than 5 μm, or substantially in the range 2 μm to 3 μm.

24. The aerosol generating device according to any one of claim 20, wherein the susceptor is or comprises a sheet of mild steel.

25. The aerosol generating device according to claim 24, wherein the sheet of mild steel has a thickness in the range of 10 μm to 50 μm, or has a thickness of 25 μm.

26. A method of operating an aerosol generating device comprising an RLC resonance circuit for inductive heating of a susceptor received in the aerosol generating device in use, the method comprising:

determining a resonant frequency of the RLC circuit;

determining a first frequency for the RLC resonance circuit for causing the susceptor to be inductively heated, the first frequency being above or below the determined resonant frequency; and controlling a drive frequency of the RLC resonance circuit to be at the determined first frequency in order to heat the susceptor.

27. A non-transitory computer-readable storage medium storing a computer program which, when executed on a processing system, causes the processing system to perform the method of claim 26.

* * * * *